United States Patent [19]

Jakubowski, Jr.

[11] Patent Number: 5,932,829
[45] Date of Patent: Aug. 3, 1999

[54] SUSPENSION AND RELEASE RACK APPARATUS CAPABLE OF CARRYING BOTH BOMBS AND MISSILES

[75] Inventor: Thaddeus Jakubowski, Jr., St. Charles, Mo.

[73] Assignee: McDonnell Douglas Corporation, St. Louis, Mo.

[21] Appl. No.: 08/927,199

[22] Filed: Sep. 11, 1997

[51] Int. Cl.$^6$ ..................................... B64D 1/06
[52] U.S. Cl. .................... 89/1.54; 244/137.4; 294/82.26; 89/1.59
[58] Field of Search ............... 294/82.26, 82.31, 294/82.32; 89/1.51, 1.54, 1.58, 1.59; 244/137.4

[56] References Cited

U.S. PATENT DOCUMENTS

| | | | |
|---|---|---|---|
| 1,508,192 | 9/1924 | Lesh | 89/1.58 |
| 2,278,482 | 4/1942 | Pishanov | 89/1.58 |
| 2,491,400 | 12/1949 | Thumim | 294/82.26 |
| 2,956,477 | 10/1960 | Barr et al. | 89/1.54 |
| 2,963,312 | 12/1960 | Schenk et al. | 294/82.26 |
| 3,036,852 | 5/1962 | Mullison | 294/82.26 |
| 3,268,188 | 8/1966 | La Roe et al. | 244/137.4 |
| 3,677,506 | 7/1972 | LaRoe | 244/137.4 |
| 3,722,944 | 3/1973 | Dand | 294/82.26 |
| 4,056,248 | 11/1977 | Hasquenoph et al. | 244/137.4 |
| 4,129,271 | 12/1978 | Hasquenoph et al. | 244/137.4 |
| 4,346,862 | 8/1982 | Richburg | 294/82.26 |
| 4,620,680 | 11/1986 | Hasquenoph et al. | 244/137.4 |
| 4,850,553 | 7/1989 | Takata et al. | 244/137.4 |
| 5,583,312 | 12/1996 | Jakubowski, Jr. | 244/137.4 |

FOREIGN PATENT DOCUMENTS

| | | | |
|---|---|---|---|
| 563335 | 9/1958 | Canada | 294/82.26 |

*Primary Examiner*—Charles T. Jordan
*Assistant Examiner*—Christopher K. Montgomery
*Attorney, Agent, or Firm*—Westerlund & Powell, P.C.; Robert A. Westerlund; Raymond H. J. Powell, Jr.

[57] ABSTRACT

Suspension and Release Equipment (S&RE) capable of carrying and releasing various types of weapons including bombs and missiles without the need for reconfiguration. The rack assembly of the present invention includes a plurality of separate, yet linked hook assemblies. A multi-purpose hook is employed to engage either bombs or missiles by means of three separate toes. A center toe includes a protruding arm adaptable for engaging the hook-shaped portion of a forward bomb bail lug which can be located either fourteen or thirty inches from the aft lug. The multi-purpose hook further includes a pair of outer toes including slots for engaging the opposite side rails of a missile lug. Because the multi-purpose hook is equally adaptable for engaging bomb or missile lugs, the rack assembly can be employed to carry either type of weapon. An aft mounted missile hook is adaptable for engaging a missile rail lug, and a separate hook mounted on the rack is adaptable for engaging a bomb lug.

14 Claims, 3 Drawing Sheets

SUSPENSION AND RELEASE RACK APPARATUS CAPABLE OF CARRYING BOTH BOMBS AND MISSILES

BACKGROUND OF THE INVENTION

The present invention is related to aircraft Suspension and Release Equipment (S&RE) capable of carrying and releasing various types of munitions. In particular, the present invention is concerned with a multi-purpose rack assembly capable, without adjustment, of carrying both air-to-ground bombs and air-to-air missiles when the rack is mounted within a bomb bay, under the aircraft wing, on a carriage adapter or other typical weapon carriage platform.

Currently, air-to-ground stores, i.e. bombs, and air-to-air missiles require completely separate suspension and release equipment. For instance, hooks mounted on bomb racks such as the BRU-32, BRU-47, or MAU-12 only have the capability of carrying bombs having a pair of conventional 14 inch or 30 inch spaced apart bail lugs. Conversely, the special lugs and button interfaces of missile launchers such as the LAU-116, can only mate with the lug outer rail surfaces and button interface mounted AIM-120 AMRAAM or similar missiles. Since modern fighter/attack aircraft are often required to carry both bombs and air-to-air missiles, a significant weight and volume penalty, as well as reconfiguration time penalty is imposed by the need to carry separate bomb and missile Suspension and Release Equipment.

A typical apparatus for carrying and launching bombs is described in U.S. Pat. No. 4,620,680 wherein hinged supports are constructed to take up several positions depending on the diameter of the load. However, the '680 apparatus has no capability for engaging the special lug rails employed with missiles. In order to carry air-to-air missiles, a separate missile launcher would need to be mounted on the aircraft.

U.S. Pat. No. 3,722,944 is assigned to the assignee of the present invention and incorporated by reference thereto. This patent is directed to a store release mechanism including an engaging hook pivotally mounted to release the lug and its attached store when desired. An explosive mechanism applies release forces either directly to the overcenter control linkage by means of a sear and pawl mechanism or through a crank and lever if the sear and pawl fails to operate. The hook assembly disclosed in the '944 patent is not capable of engaging the lug rails of an AIM-120 missile without being completely redesigned.

In order to move a bomb rack hook assembly from its locked to its release position, U.S. Pat. No. 3,677,506 issued to La Roe employs a cam mechanism which, when rotated, allows movement of one of the hook supports so that the hook can rotate to disengage itself from the store lug. As a result, relatively low release forces are required to control and release large hook loads. Nevertheless, La Roe does not suggest that this release mechanism can be applied to missile launchers having lug rail interfaces.

Finally, Pat. No. 4,850,553 is of interest as disclosing a store rack and ejector mechanism employing pressurized gas to forcibly eject a released store beyond the aircraft's air stream envelope. However the ejection mechanism is described as applicable to the ejection of bombs and there is no suggestion of a multi-purpose rack capable of launching both bombs and missiles.

What is clearly needed is a multi-purpose S&RE rack assembly which is compatible with both bomb and missile Suspension and Release Requirements, which minimizes the weight penalty currently incurred when both types of racks are employed, which minimizes the volumetric impact of the rack assembly in the bomb bay or beneath the pylon, and which eliminates the need to reconfigure the aircraft to accommodate a missile launcher. As will become evident, the present invention provides a unique apparatus which fulfills all of these needs without requiring separate rack assemblies for bombs and missiles.

SUMMARY OF THE INVENTION

The multi-purpose rack assembly built in accordance with the present invention combines the capability of a typical bomb rack by engaging and carrying stores with either 14", 30" or 14" and 30" spaced bail lugs as well as the capability of a typical missile launcher in carrying and ejecting an AIM-120 AMRAAM or other known missile. Logistics and procurement costs for a multi-purpose rack assembly constructed in accordance with the present invention will be substantially reduced due to the reduction in separate equipment as compared with the current requirement for separate bomb and missile rack assemblies.

The present invention encompasses a multi-purpose suspension and release bomb and missile rack assembly including three separate components. The components include a first pair of lug hooks spaced 30 inches apart, a second pair of lug hooks spaced 14 inches apart and a pair of hooks specially constructed to engage rail lugs mounted on a missile such as the AIM-120. The rack assembly provides an electrical connector for engaging a missile's electrical and guidance systems. The 14 and 30 inch bail hooks are linked together to operate as a pair (forward pair/aft pair). The present invention is not intended to be limited to racks containing 14 and 30 inch lug hooks and may be configured as either 14 inch, 30 inch or 14 and 30 inch rack assemblies.

The forward 14 inch hook is considered unique because it is multi-purpose in nature and adaptable for retaining either bombs or missiles without reconfiguration. The forward 14 inch hook incorporates three separate interface toes. The center toe provides a hook interface for a standard 14 inch bail lug weapon, i.e., bomb lug. The two (2) outer toes are configured to latch onto opposite outer rail surfaces of the forward lug of a missile such as the AIM-120 AMRAAM. With its unique geometry, the forward hook is capable of carrying either weapon type without interference or the need for additional hooks (except for the use of an aft hook which carries the aft end of the missile), removable/replaceable parts or adapters.

A cylinder containing pressurized gas may be employed to energize linkage which move the hooks from their initially locked positions to their release positions and subsequently energize rams, thereby allowing the stores to be ejected from the rack assembly. Such a pneumatic ejection system is described in the inventor's U.S. Pat. No. 5,583,312 issued December 1996, entitled "Cold Gas Ejector Rack", assigned to the same assignee as the present invention, and incorporated herein by reference thereto.

As well as bombs, the rack assembly of the present invention is capable of carrying and launching a missile such as the AIM-120 AMRAAM. To this end, the rack includes an electrical connector which provides the required interface to the missile guidance electronics. The rack further includes typical embodiments required by military standards, such as MIL-STD-2088, as well as meeting the MIL-STD-1760 electrical capability. Because of the additional length of the AIM-120 missile as compared to many conventional bombs as well as its unique mid lug arrangement, an additional aft hook is permanently incorporated into the rack assembly for interface and releasable attachment with a lug such as the AIM-120 center lug. In the 14 and 30 inch rack configuration, the additional aft hook links directly to the aft 30 inch lug hook by means of a pivoting linkage. This arrangement is unique in that neither the 30 inch aft hook nor the additional missile aft hook will interfere with the other when not in use, making it possible for the rack to permanently retain both aft hooks even when only one hook is needed for a particular mission.

The bomb rack assembly of the present invention has applicability as an internal, external pylon mounted or conformal and tangential external weapon carriage rack and can also be mounted on multi-position adapters commonly known as VER, TER or MERs. By integrating the missile carriage and bail lug carriages into a single carriage device, the plurality of currently required assemblies is reduced to a single ejector rack.

BRIEF DESCRIPTION OF THE DRAWINGS

For a better understanding of the present invention, one embodiment thereof will be described hereafter in greater detail with reference to the accompanying drawings in which.

DETAILED DESCRIPTION OF THE PREFERRED EMBODIMENT

Figure 1:
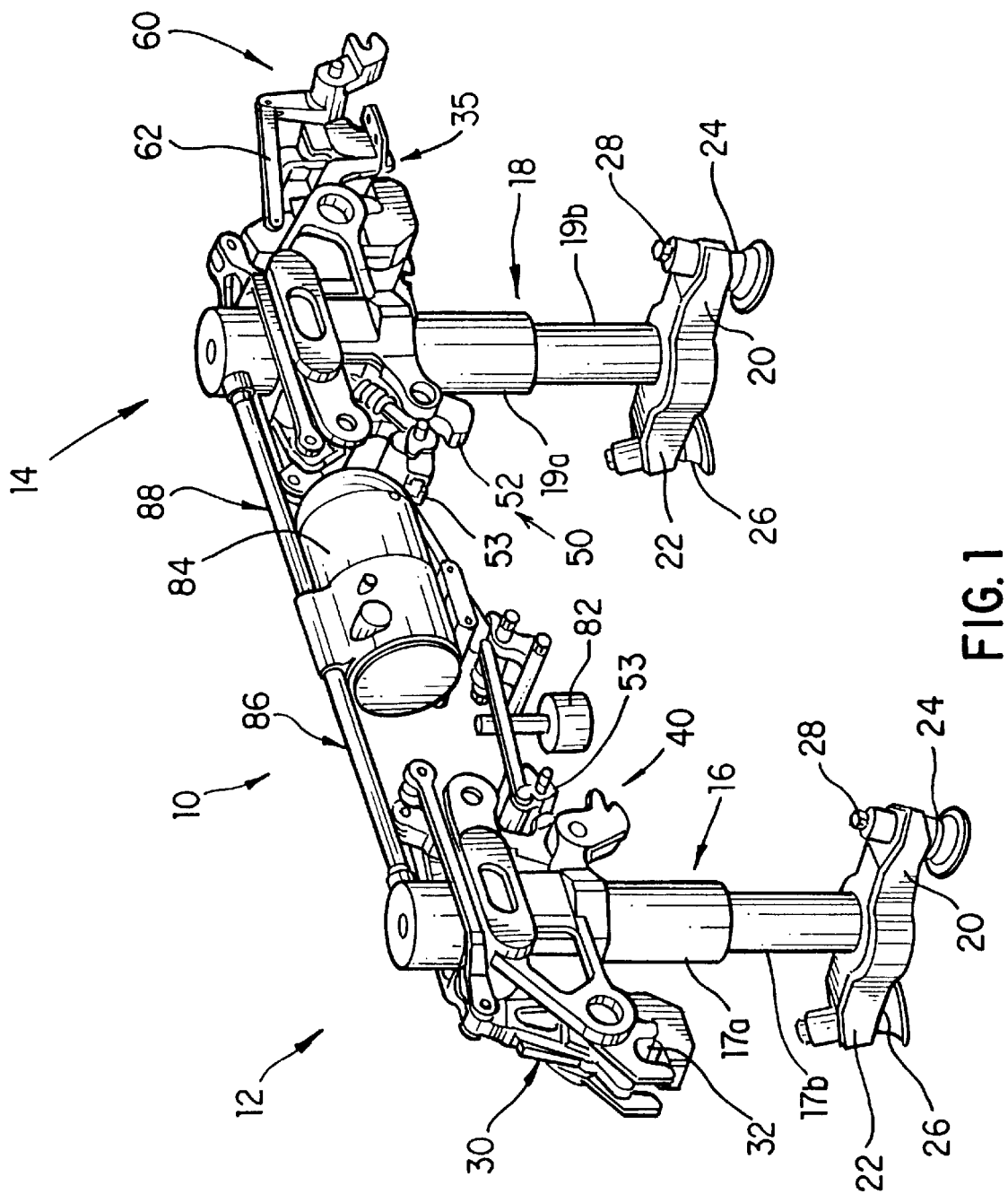
FIG. 1 is a schematic view of an ejection rack constructed in accordance with the present invention.

Reference numeral 10 in FIG. 1 generally indicates a multi-purpose storage and ejector rack assembly constructed in accordance with the present invention. Rack assembly 10 may be employed as an internal bay weapon carriage, an external pylon weapon carriage or a conformal and tangential external weapon carriage. Rack assembly 10 includes a forward end portion 12 and an aft end portion 14. Located at either end of rack 10 are forward and aft support members 16 and 18, respectively. Support member 16 includes telescoping portions 17a, 17b, and support member 18 includes telescoping portions 19a and 19b. Each of the support members 16 and 18 is capable of telescoping downwardly from rack assembly 10 towards a weapon, i.e., store or missile (not shown), suspended beneath rack assembly 10. In order to maintain the weapon in its proper position suspended beneath rack assembly 10, each support member 16 and 18 has a pair of outwardly extending sway braces 20 and 22. Conventional adjustable set screw brace devices 24 and 26 each extend through threaded openings in the sway braces 20 or 22. Each of the set screws 24 and 26 can be advanced into contact with the weapon to prevent the weapon from swaying. Nuts 28 mounted on each set screw are selectively tightened against the sway braces to maintain the set screws 24 and 26 in their desired positions.

Figure 2B:
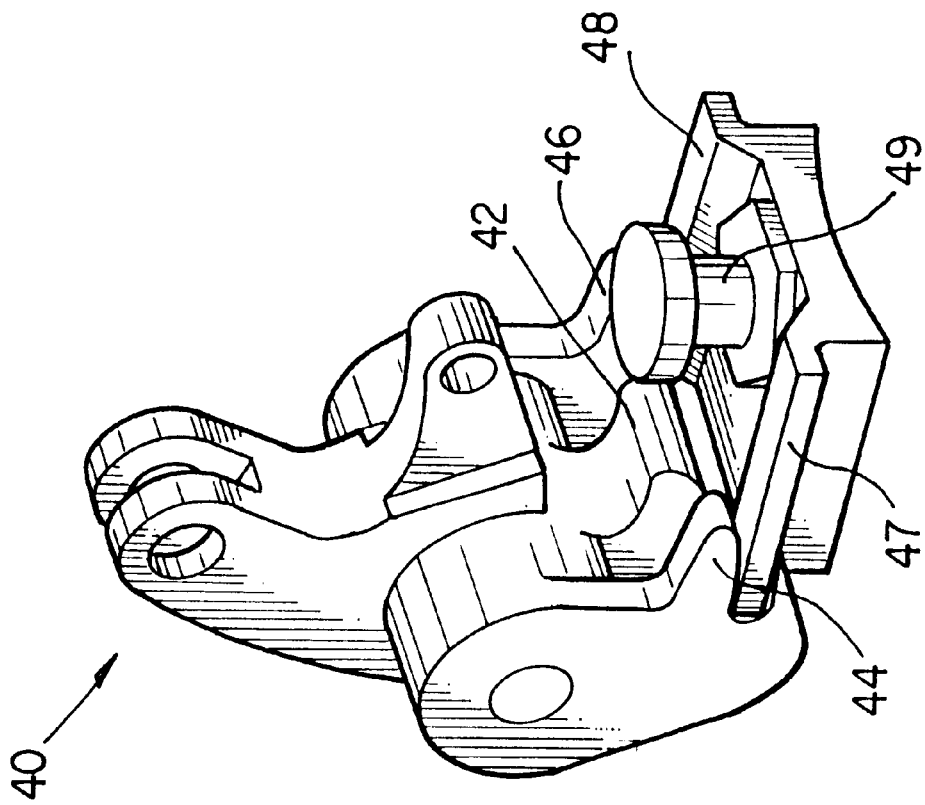
FIG. 2B is a schematic view of the multi-purpose hook of FIG. 2A shown attached to a missile mounted rail lug.
Figure 2A:
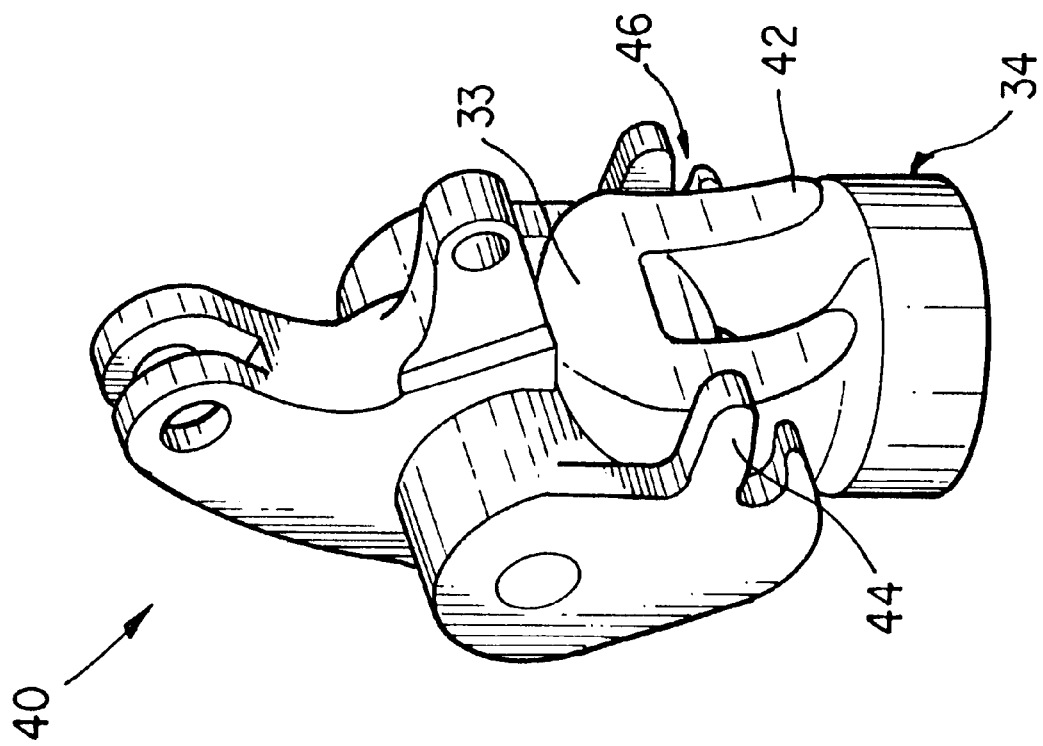
FIG. 2A is a schematic view of a multi-purpose hook assembly constructed in accordance with the present invention, and attached to a store mounted bail lug.

A forward lug hook assembly 30 is mounted at the forward end 12 and includes a centered toe 32 which can selectively pivot into and out of a bail lug engagement hoop (similar to hoop 33 of bail lug 34 shown in FIG. 2A). An aft facing lug hook assembly 35 is mounted at the aft end 14 and includes a centered toe 36, see FIG. 3 (preferably identical to and interchangeable with center toe 32). When engaged, forward centered toe 32 supports a bomb's forward bail lug while aft centered toe 36 supports the bomb's aft bail lug. The forward and aft centered toes 32 and 36 are spaced substantially 30 inches apart in order to carry a bomb having bail lugs spaced substantially 30 inches apart. As shown in FIG. 1, hook assembly 30 faces in a forward direction, while hook assembly 35 faces in the opposite or aft direction. When the toes 32 and 36 are pivoted through their respective bail lug hoops into their locked positions (not shown), the two hook assemblies 30 and 35 carry the weight of the bomb suspended beneath rack assembly 10.

Forward end 12 of rack assembly 10 further includes a hook assembly 40 mounted on an opposite side from hook assembly 30. Hook assembly 40 is aft facing, multi-purpose in nature and incorporates three interface toes. As best shown in FIGS. 2A and 2B, hook assembly 40 includes a centered toe 42 (similar to centered toes 32 and 36) which selectively pivots through the hoop portion 33 of forward bail lug 34 attached to a store (not shown). When centered toe 42 engages hoop 33, hook assembly 40 serves to retain the forward bomb end portion in a suspended position beneath rack assembly 10, in a manner similar to the operation of hook assemblies 30 and 35.

As best shown in FIG. 2B, hook assembly 40 further includes a pair of oppositely disposed outer toes 44 and 46, each having a slot adaptable for receiving an outer rail surface 47 or 48, respectively, of forward missile lug 49 of the type employed with the AIM-120 AMRAAM missile, not shown. When it is required for rack assembly 10 to carry an AIM-120 type missile, missile lug 49 is raised toward hook assembly 40 until rails 47 and 48 enter the slots in toes 44 and 46, eventually engaging and pivoting the outer toes 44 and 46 into their locked positions. There is no need to replace, remove or redesign hook assembly 40 when converting between carrying bombs and missiles. Centered toe 42 will not interfere with outer toes 44 and 46 engaging rails 47 and 48. Conversely, outer toes 44 and 46 will not interfere with the pivoting interaction of centered toe 42 and hook 33 portion of bail lug 34. As a result, the single hook assembly 40 is uniquely designed to support both bail lugs and missile lugs with a single configuration.

The aft end 14 of rack assembly 10 includes a further, forward facing hook assembly 50 mounted on an opposite side from hook assembly 35. Hook assembly 50 includes a centered toe 52 adaptable for engaging an aft bail lug hoop, not shown. Because hook assemblies 40 and 50 face towards one another and are preferably spaced substantially 14 inches apart, they are capable of carrying a store having bail lugs spaced substantially 14 inches apart. Hook assemblies 40 and 50 each may include an overcenter lock cam assembly 53 of the type disclosed in the La Roe patent and incorporated by reference. In order to simultaneously move the centered toes of hook assemblies 40 and 50 to their unlocked positions, it is necessary for a cam to move overcenter as taught by La Roe. Alternatively, any conventional cam release mechanism can be employed for moving the hook toes from their locked to their release positions. In any case, once the centered toes 42 and 52 are moved to their unlocked positions out of engagement with the bail lugs, the bomb is free to separate from rack assembly 10. Also, since hooks 30 and 35 are directly linked to hooks 40 and 50, it can be understood that initiation of the release procedure would also release stores supported on hooks 30 and 35 spaced 30 inches apart.

In order for rack assembly 10 to carry a missile of the AIM-120 AMRAAM type, a separate hook in addition to hook assembly 40 must be employed. It has been discovered that the best arrangement is to mount an additional missile hook assembly aft of hook 35. This arrangement ensures that hooks are available which are compatible with the existing spacing of AIM-120 rail lugs.

Figure 3:
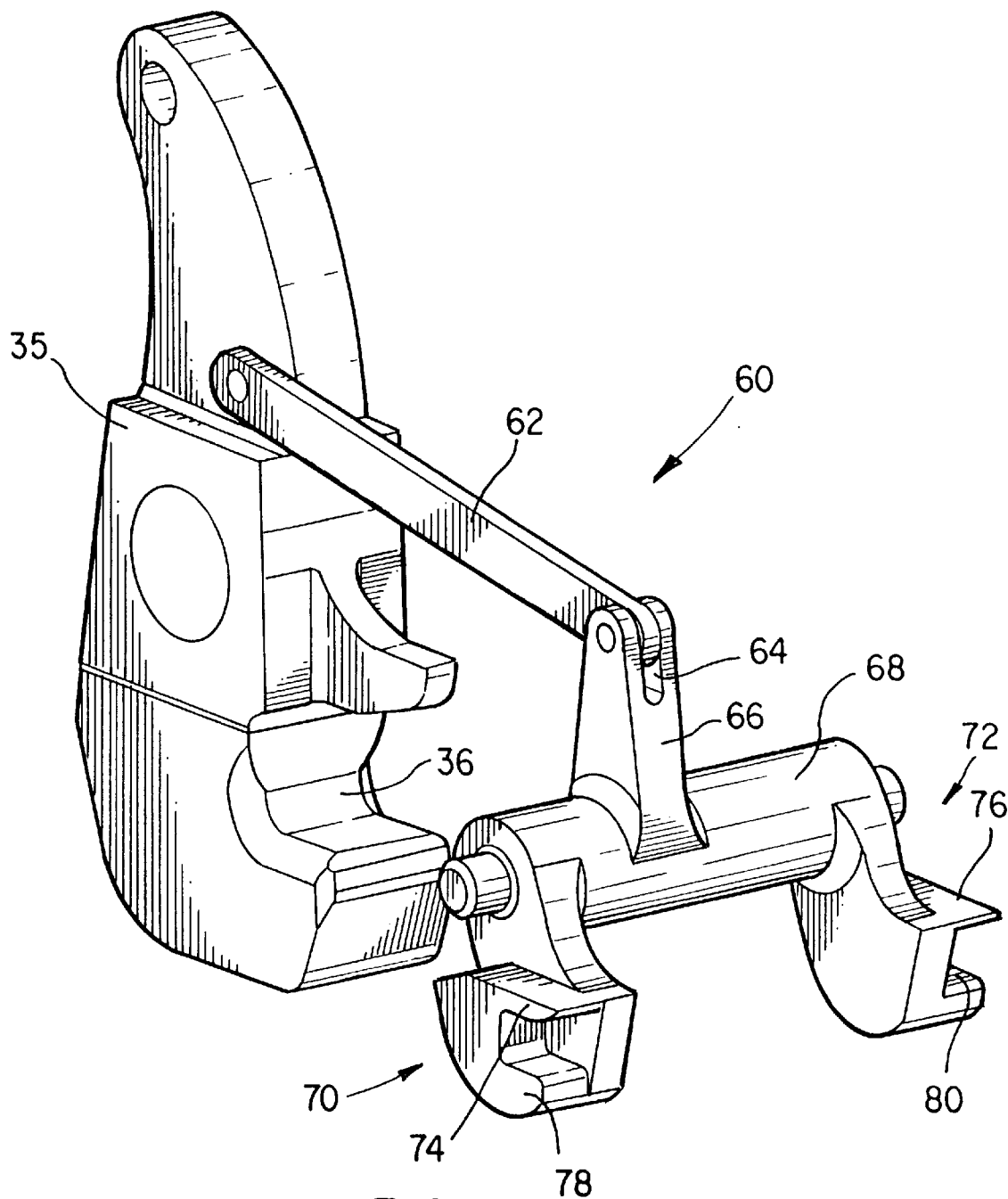
FIG. 3 is a schematic view of a rack assembly constructed in accordance with the present invention and including a unique aft missile hook assembly.

As shown in FIGS. 1 and 3, a missile aft hook assembly 60 is spaced aft from and preferably attached to the support structure of hook assembly 35. Aft hook assembly 60 is attached to hook assembly 35 by a control arm 62 attached at one end to the support structure of hook 35 and at an opposite end extends into an opening 64 formed in attachment arm 66. A fastener, not shown, extends through aligned openings in arms 62 and 66, allowing the connected arms to pivot relative to one another. Arm 66 engages a rod-shaped member 68 extending beyond opposite sides of arm 66. Attached to opposite ends of rod member 68 are toes 70 and 72, respectively. The toes 70 and 72 are provided with respective upper tangs 74 and 76, with the tangs 74 and 76 preferably extending parallel to one another. When a missile is raised upwardly towards rack 10, as occurs when the missile is being loaded, the outer rails of the missile lug (see rails 47 and 48 in FIG. 2B) engage tangs 74 and 76, respectively, causing toes 70 and 72 to rotate to their closed or locked positions.

The toes 70 and 72 are further provided with lower carriage surfaces 78 and 80, respectively, which surfaces engage and support the missile aft lug and attached missile. When loaded, the aft lug of the missile is entirely supported by hook assembly 60 while the forward missile lug assembly is entirely supported by hook assembly 40. In effect, multi-purpose hook 40 serves to support either the forward lug of a 14 inch store or the forward lug of a missile without any modification, replacement or redesign of the hook assembly. The ability of hook assembly 40 to engage either bail or missile lugs without modification is believed to be both unique and unobvious as compared to hook assemblies employed on known weapon racks.

In order to communicate with the missile's electrical and guidance systems as required, a connector 82 mounted on rack assembly 10 is aligned with and engages a connector on the missile's surface, not shown.

Because of the unique arrangement of hook assemblies 30, 35, 40, 50 and 60 it is possible for the same rack assembly 10 to carry either 14 inch or 30 inch stores or, alternatively, AIM-120 AMRAAM missiles, as well as other missiles having similarly located lug assemblies, without interference or the need for additional hooks, removable/replaceable parts or adapters. It also within the scope of the present invention to serve as a 30 inch, 14 inch or 14 and 30 inch rack assembly.

In order to forcibly eject a released store or missile from rack assembly 10, a pneumatic release and ejection system of the type described in the inventor's U.S. Pat. No. 5,583,312 can suitably be employed. Pressurized gas, such as air, is stored in canister 84 and, upon command, is ejected though passageways 86 and 88 connecting canister 84 with the various hook assemblies. As described in the co-pending application, the pressurized gas depresses one or more pistons which, in turn, provide sufficient thrust to forcibly eject the store or missile from its released position beneath rack assembly 10.

The present invention is believed to be unique in its ability to carry either an AIM-120 type missile or conventional stores without the need to modify the rack assembly in any manner. This greatly reduces the Suspension and Release Equipment currently required to carry both stores and missiles as required in a standard weapon complement for many military aircraft.

Although the present invention has been described in detail hereinabove, it should be clearly understood that many variations and/or modifications of the basic inventive concepts taught herein will still fall within the spirit and scope of the present invention as defined in the appended claims.

What is claimed is:

1. A multi-purpose rack assembly capable of supporting and releasing either bombs or missiles without adjustment or reconfiguration of the rack, comprising:

a frame having a forward portion and an aft portion;

a multi-purpose, first hook assembly mounted on the forward portion of the frame;

at least one bomb hook assembly mounted on the aft portion of the frame, the bomb hook assembly including at least one toe shaped for engaging a bomb mounted bail lug;

a missile hook assembly mounted at the aft end of the frame, the missile hook assembly including at least one toe shaped for engaging a missile mounted rail lug; and the multi-purpose first hook assembly having a plurality of separate toes, with each toe facing in the aft direction of the frame and positioned for engaging and supporting either a bomb mounted bail lug or a missile mounted rail lug without adjustment or reconfiguration of the first hook assembly.

2. The multi-purpose rack assembly according to claim 1, wherein the missile hook assembly is spaced from and pivotally connected to the aft end of the frame.

3. The multi-purpose rack assembly according to claim 1, wherein an overcenter cam mechanism is mounted on the frame and linked to the multi-purpose first hook assembly and to at least one hook assembly mounted on the aft end of the frame for controlling simultaneously movement of each hook assembly.

4. The multi-purpose rack assembly according to claim 1, wherein the plurality of toes of the multi-purpose first hook assembly comprises a hook with three separate engagement toes, including a center toe having a protruding, curved arm portion configured to engage a bomb mounted bail lug, and further including a pair of spaced-apart outer toes mounted on opposite sides of the center toe, with the outer toes having slots configured to engage and support a missile mounted bail lug.

5. The multi-purpose rack assembly according to claim 1, wherein a pressurized gas and piston ejector system is mounted on the frame and in compact with the hook assemblies, whereby the ejector system functions to eject a bomb or missile supported by the rack assembly when desired.

6. A multi-purpose rack assembly capable of retaining and releasing either bombs or missiles without reconfiguration or adjustment of the rack, comprising:

a frame having a forward portion and aft portion;

first and second hook assemblies mounted on a forward portion of the frame;

third and fourth hook assemblies mounted on an aft portion of the frame;

a fifth hook assembly positioned beyond and attached to the aft portion of the frame;

the first hook assembly including a center toe for engaging a bomb mounted bail lug;

wherein the first and third hook assemblies face one another, are spaced substantially fourteen (14) inches apart, and are linked for simultaneous movement between respective engagement and release positions and, wherein the second and fourth hook assemblies face in opposite directions, are spaced substantially thirty (30) inches apart and are linked for simultaneous movement between respective engagement and release positions.

7. A multi-purpose rack assembly capable of supporting and releasing either bombs or missiles without adjustment or reconfiguration of the rack assembly, comprising:

a frame having a forward portion and an aft portion;

first and second hook assemblies mounted on the forward portion of the frame;

third and fourth hook assemblies mounted on the aft portion of the frame;

a fifth hook assembly mounted aft of the fourth hook assembly, wherein the first hook assembly comprises a hook with a plurality of engagement toes facing in substantially the same direction toward the aft portion of the frame, wherein one toe is configured to engage and support a hoop-shaped portion of a bomb mounted bail lug and at least one other toe is configured to engage and support a missile rail lug without any reconfiguration of the first hook assembly;

wherein the third hook assembly comprises a hook with an engagement toe facing toward the forward end of the frame, wherein the engagement toe is configured to engage and support a hoop-shaped portion of a bomb mounted bail lug, with the first and third hook assemblies linked for simultaneous movement; and, wherein the fifth hook assembly includes a hook facing in the aft direction, with the aft facing hook having a pair of toes formed with slots configured to engage and support a missile rail lug positioned beneath the rack without reconfiguration of the first hook assembly.

8. The multi-purpose rack assembly according to claim 7, wherein the first and third hook assemblies are spaced substantially fourteen (14) inches apart in order to engage bomb mounted bail lugs.

9. The multi-purpose rack assembly according to claim 7, wherein the second and fourth hook assemblies face away from one another and are linked for simultaneous movement between respective engagement and release positions.

10. Th multi-purpose rack assembly according to claim 9, wherein the second and fourth hook assemblies are spaced substantially thirty (30) inches apart in order to engage bomb mounted bail lugs.

11. The multi-purpose rack assembly according to claim 7, wherein the first hook assembly plurality of engagement toes includes three separate engagement toes including a first, center toe having a protruding, curved arm for selectively engaging and supporting a hook-shaped portion of the bomb mounted bail lug.

12. The multi-purpose rack assembly according to claim 11, wherein the three separate engagement toes further include two spaced-apart outer toes mounted on opposite sides of the center toe, with each outer toe including a slot configured to engage and support a missile rail lug.

13. The multi-purpose rack assembly according to claim 7, wherein the engagement toes of the first hook assembly face toward the aft portion of the frame and the engagement toe of the third hook assembly faces toward the forward portion of the frame, with the first and third hook assemblies linked for simultaneous movement between respective engagement and release positions.

14. The multi-purpose rack assembly according to claim 7, wherein the fifth hook assembly is liked to the first hook assembly for joint movement.

* * * * *